United States Patent
Cutler

(10) Patent No.: US 10,822,113 B2
(45) Date of Patent: *Nov. 3, 2020

(54) ACTUATOR MONITORING SYSTEM USING INERTIAL SENSORS

(71) Applicant: Kitty Hawk Corporation, Mountain View, CA (US)

(72) Inventor: Mark Johnson Cutler, Sunnyvale, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 16/126,950

(22) Filed: Sep. 10, 2018

(65) Prior Publication Data
US 2019/0061973 A1    Feb. 28, 2019

Related U.S. Application Data

(63) Continuation of application No. 15/689,892, filed on Aug. 29, 2017, now Pat. No. 10,112,727.

(51) Int. Cl.
*B64D 45/00* (2006.01)
*G01C 21/16* (2006.01)
*B64C 13/16* (2006.01)
*B64F 5/60* (2017.01)

(52) U.S. Cl.
CPC ............... *B64D 45/00* (2013.01); *B64C 13/16* (2013.01); *B64F 5/60* (2017.01); *G01C 21/16* (2013.01); *B64D 2045/0085* (2013.01)

(58) Field of Classification Search
CPC ... B64D 45/00; B64D 2045/0085; B64F 5/60; B64C 13/16; G01C 21/16
See application file for complete search history.

(56) References Cited

U.S. PATENT DOCUMENTS

| | | | |
|---|---|---|---|
| 5,115,996 A * | 5/1992 | Moller | B64C 29/0025 239/265.19 |
| 6,702,234 B1 * | 3/2004 | Goodzeit | B64G 1/283 244/164 |
| 7,356,336 B2 | 4/2008 | Perez | |
| 9,609,288 B1 * | 3/2017 | Richman | H04N 7/183 |
| 9,908,616 B1 * | 3/2018 | Horn | B64C 13/18 |
| 2004/0093130 A1 | 5/2004 | Osder | |
| 2005/0114023 A1 | 5/2005 | Williamson | |
| 2005/0133671 A1 * | 6/2005 | Wang | B64G 1/244 244/170 |
| 2006/0126608 A1 | 6/2006 | Pereira | |

(Continued)

*Primary Examiner* — Behrang Badii
*Assistant Examiner* — Daniel L Greene
(74) *Attorney, Agent, or Firm* — Van Pelt, Yi & James LLP

(57) ABSTRACT

Sensor data is received from an inertial measurement unit on a vehicle. An observed attitude and an observed attitude rate of the vehicle are determined based on the sensor data. Using a model associated with a vehicle failure mode, an expected attitude and an expected attitude rate of the vehicle are determined. A malfunctioning rotor is determined based on the observed attitude, the observed attitude rate, the expected attitude, and the expected attitude rate. In response to identifying the malfunctioning rotor, a responsive action is performed, including by updating a geometry matrix so that at least one non-malfunctioning rotor in the plurality of rotors compensates for the malfunctioning rotor.

18 Claims, 11 Drawing Sheets

(56) References Cited

U.S. PATENT DOCUMENTS

| | | |
|---|---|---|
| 2006/0180371 A1 | 8/2006 | Breed |
| 2006/0186274 A1* | 8/2006 | Wang .................... B64G 1/244 |
| | | 244/158.4 |
| 2007/0023579 A1* | 2/2007 | Wang .................... B64G 1/244 |
| | | 244/158.6 |
| 2010/0017049 A1 | 1/2010 | Swearingen |
| 2011/0172855 A1* | 7/2011 | Marstall ................. G01C 23/00 |
| | | 701/9 |
| 2011/0180656 A1 | 7/2011 | Shue |
| 2013/0274991 A1 | 10/2013 | Cheriere |
| 2014/0027564 A1* | 1/2014 | Mercer .................. G05D 1/102 |
| | | 244/17.13 |
| 2016/0159471 A1 | 6/2016 | Chan |
| 2017/0066531 A1 | 3/2017 | McAdoo |
| 2017/0144761 A1 | 5/2017 | Bluvband |

\* cited by examiner ent application Ser. No. 15/689,892, issued as U.S. Pat. No. 10,112,727, entitled ACTUATOR MONITORING SYSTEM USING INERTIAL SENSORS filed Aug. 29, 2017 which is incorporated herein by reference for all purposes.

BACKGROUND OF THE INVENTION

In operating a vehicle, a human controller or automated control system of the vehicle may require up-to-date information on the vehicle's state in order to effectively command the vehicle. For example, information on actuator failures is required. In the event a rotor, a flap, a tilt-wing, a valve, or any other actuator of the vehicle malfunctions, the vehicle may behave in an undesired manner in lieu of immediate detection and responsive action. A typical solution may involve installing sensors or monitors on individual actuators. Monitoring multiple actuators of a vehicle may be cost-prohibitive or complex.

BRIEF DESCRIPTION OF THE DRAWINGS

Various embodiments of the invention are disclosed in the following detailed description and the accompanying drawings.

DETAILED DESCRIPTION

Figure 1:
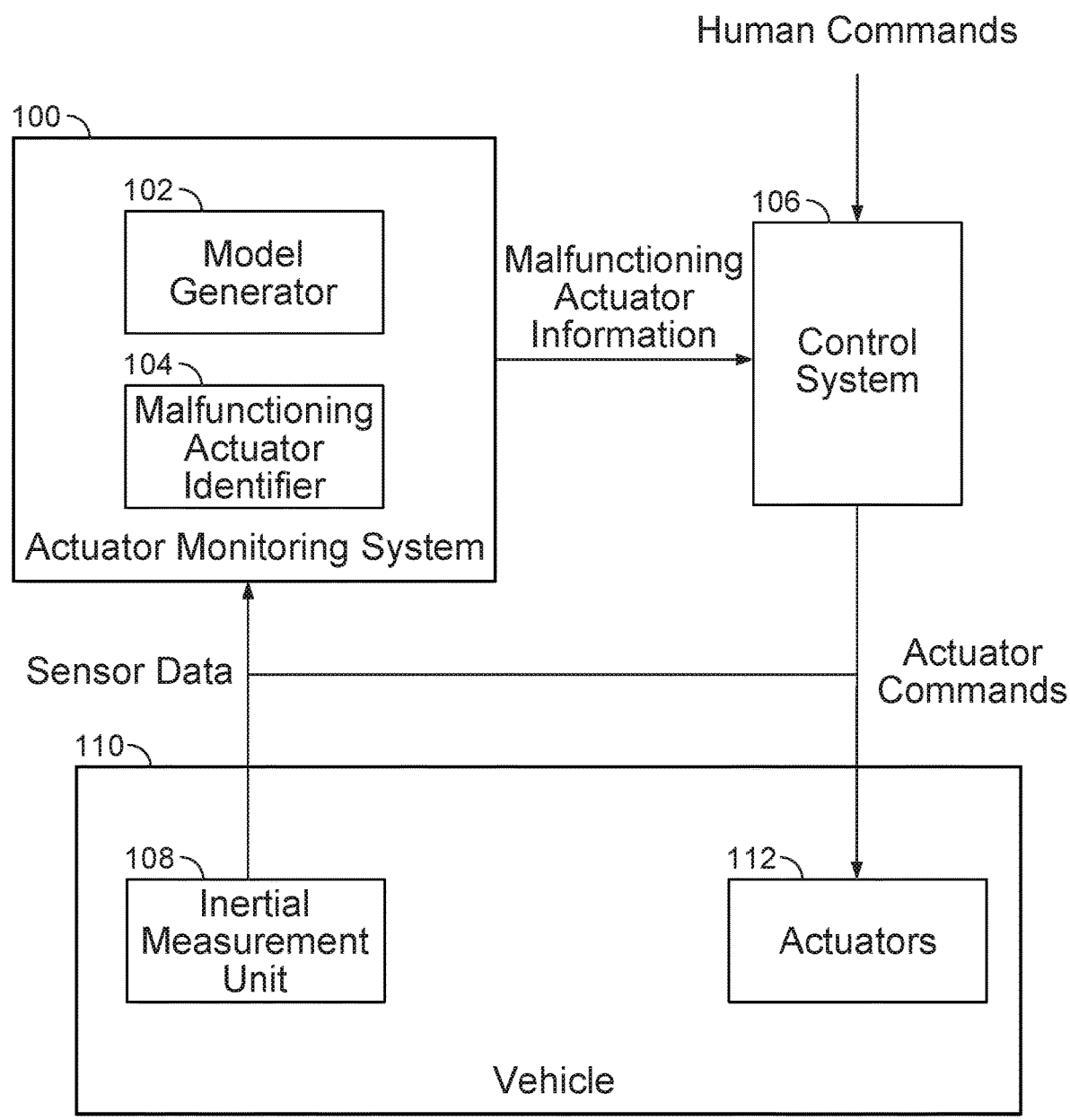
FIG. 1 is a diagram illustrating an embodiment of an actuator monitoring system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An actuator monitoring system is disclosed. The system includes an interface configured to receive sensor data from an inertial measurement unit on a vehicle. The system also includes a processor configured to determine an observed attitude and observed rate of change in attitude of the vehicle based on the sensor data and determine an expected attitude and expected rate of change in attitude of the vehicle based on a model of a vehicle failure mode. The processor is configured to identify a set of one or more malfunctioning actuators based on the observed attitude, observed rate of change in attitude, expected attitude, and expected rate of change in attitude. The processor is additionally configured to perform a responsive action based on the set of one or more malfunctioning actuators.

In some embodiments, a vehicle failure mode indicates one or more specific actuators of a vehicle are malfunctioning. For example, one failure mode comprises a front left rotor failure whereas another failure mode comprises a back right rotor failure. A vehicle failure mode may indicate a group of failed actuators (e.g., where one of the actuators in the group is believed to have failed but is not specifically identified). In some embodiments, multiple models of the vehicle are determined based on multiple vehicle failure modes. An expected attitude and expected attitude rate may be determined based on each model. For example, expected attitude and attitude rates based on different actuator failures are determined. In some embodiments, the multiple expected attitudes and expected attitude rates are compared to an actual attitude and attitude rate as observed by an inertial measurement unit. In the event the actual values match or approximately match expected values of a model, a corresponding failure mode of the model may be determined to be in effect. For example, the one or more actuators indicated by the failure mode are determined to be malfunctioning.

In some embodiments, the disclosed system combines use of inertial sensors and model-based estimation to provide a robust, lightweight, and inexpensive means to monitor and respond to actuator failures. Typical solutions may require speed controllers, sensors, or gauges designed to specifically measure output or function of actuators. The disclosed system measures whether the desired effect of the actuators is occurring by using high-level models rather than measuring a direct output of the actuators. Detecting high-level performance may provide greater accuracy. For example, a motor speed detector provides information on the motor but is unaware of a broken propeller, whereas a high-level model catches that the vehicle is not moving in a direction it was commanded to. Utilizing an existing inertial measurement unit to determine actuator operability in lieu of additional equipment may provide a lightweight solution in vehicles such as aircraft that have weight restrictions. Cost and complexity due to specialized monitoring equipment or repairs to actuator output monitoring equipment is eliminated.

In some embodiments, the disclosed system is used to quickly detect faults in the vehicle and automatically perform responsive actions. Responsive actions may comprise corrective actions, such as adjusting flight controls, or warning actions, such as providing information to a vehicle operator.

FIG. 1 is a diagram illustrating an embodiment of an actuator monitoring system. In the example shown, actuator monitoring system 100 includes model generator 102 and malfunctioning actuator identifier 104. In some embodiments, model generator 102 generates models for a variety of failure modes. For example, each failure mode describes a specific actuator failure that could occur. In the example shown, actuator monitoring system 100 receives sensor data from inertial measurement unit 108 and actuator commands from control system 106. Based on actuator commands and sensor data describing a past state of a vehicle, model generator 102 determines models of expected vehicle state in different failure modes. Based on sensor data describing a current state of a vehicle and the models output by the model generator, malfunctioning actuator identifier 104 compares observed metrics of the vehicle to expected metrics of the vehicle in different failure modes (e.g., described in the various models) in order to identify whether one or more actuators are failing. For example, malfunctioning actuator identifier may sort models based on their expected metrics and select the model that has expected metrics that closely match actual or observed metrics. In one example, the metrics compared include attitude and rates of change in attitude of the vehicle.

In some embodiments, malfunctioning actuator identifier 104 also compares observed metrics of the vehicle to expected metrics of the vehicle in an operable mode (e.g. no actuator failures associated with a "no failure" model).

In the event one or more actuators are identified as failing, that information is conveyed to control system 106 via the malfunctioning actuator information. In some embodiments, information is provided to control system 106 that all actuators are operable when all actuators are so believed to be operable. In some embodiments, information is not provided from actuator monitoring system 100 to control system 106 in the event all actuators are determined to be operable.

In some embodiments, control system 106 comprises a flight computer, autopilot, or other processor. As shown, control system 106 receives human commands. For example, human commands may be provided by a pilot of an aircraft or a driver of a vehicle. In some embodiments, control system 106 processes the human commands and outputs actuator commands. For example, a human may indicate a turn to the left and control system 106 provides instructions to rotors on one side of an aircraft to increase thrust. The control system 106 may determine actuator commands that cause the vehicle to behave differently than human commands direct. For example, a driver may attempt to drive the vehicle at a dangerously high speed, in which case the control system limits the speed the vehicle will reach. The control system may limit or translate human commands. In some embodiments, control system 106 determines actuator commands based on human commands and malfunctioning actuator information. For example, the control system determines instructions for actuators based on a desired trajectory of the vehicle as indicated by human commands utilizing operable actuators and accounting for actuator failures. For example, rotors surrounding a malfunctioning rotor may be commanded to increase thrust in order to account for the malfunctioning rotor. In lieu of human commands, control system 106 may automatically determine a trajectory for the vehicle and provide corresponding commands for the actuators (e.g., the control system includes an autopilot).

In the example shown, actuators 112 receive actuator commands provided by control system 106. The actuators include mechanism(s) that control system 106 commands. In some embodiments, the actuator comprises a powered mechanism that is used to change the vehicle's position. In various embodiments, actuators of the vehicle include a rotor, a flap, a gear, a tilt-wing, a valve, an aileron, or any appropriate mechanism. Vehicle 110 includes actuators 112 and inertial measurement unit 108. For example, the actuators and inertial measurement unit are positioned on or in the vehicle. The vehicle may be an aircraft and/or a multicopter.

In some embodiments, an actuator has different failure modes which are represented by the various models. For example, a rotor may fail by outputting max thrust, outputting zero thrust, or be stuck at an intermediate setting. In some embodiments, models are determined based on and/or for various actuator settings. In various embodiments, only highly likely or relatively dangerous actuator failure modes are considered and modeled. For example, a rotor may be modeled for a zero-output case but not for a pinned high case.

Figure 2:
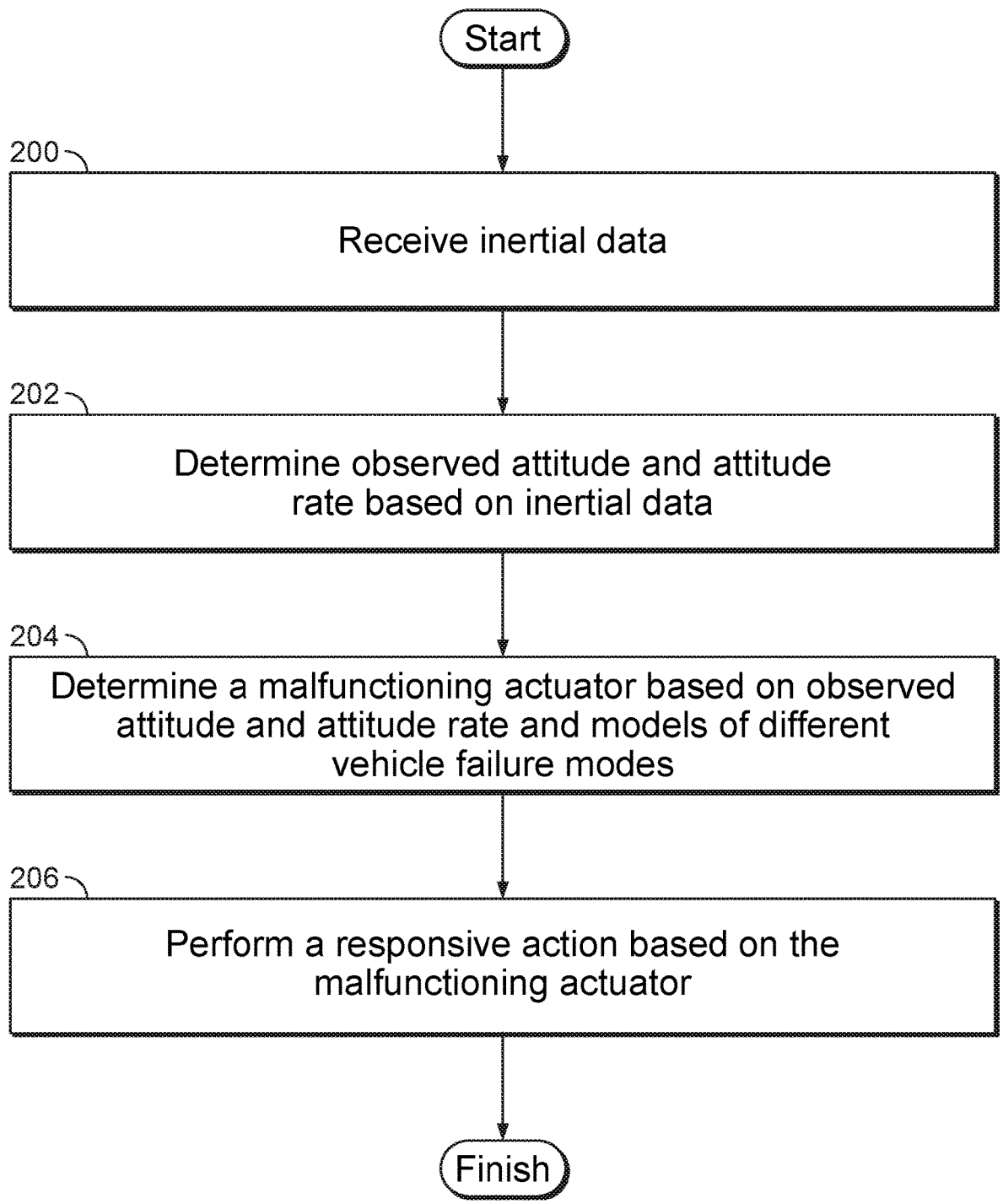
FIG. 2 is a flow diagram illustrating an embodiment of an actuator monitoring system process.

FIG. 2 is a flow diagram illustrating an embodiment of an actuator monitoring system process. At 200, inertial data is received. For example, roll, pitch, yaw and rates of each for an aircraft or underwater vehicle may be received.

At 202, an observed attitude and attitude rate are determined based on inertial data. The observed attitude and attitude rate may comprise the most current measured attitude and attitude rate. In one example, this calculation or determination is done by an inertial measurement unit, such as inertial measurement unit 108 in FIG. 1. The sensor data exchanged between inertial measurement unit 108 and malfunction actuator identifier 104 would thus include the observed attitude and attitude rate.

At 204, a malfunctioning actuator is determined based on the observed attitude, the observed attitude rate, and models of different vehicle failure modes. In some embodiments, an expected attitude and expected attitude rate is determined based on and/or for each model (e.g., for a first type of failure, a first attitude and attitude rate are expected, for a second type of failure, a second attitude and attitude rate are expected, and so on). The models may be determined based on a past state, including a past observed attitude and attitude rate (that is, historic information for a specific and known failure mode). In some embodiments, the models are determined based on vehicle geometry, past actuator commands, and/or models of environmental factors (e.g. wind).

At 206, a responsive action is performed based on the malfunctioning actuator. In FIG. 1, for example, the failing rotors may be identified to control system 106 via the malfunction actuator information. In response, the control system may adjust the actuator commands sent to actuators 112 so that the other, non-failing actuators compensate for the failing rotor (e.g., a redistribution of torque to rotors and/or an increase in torque to rotors).

Figure 3:
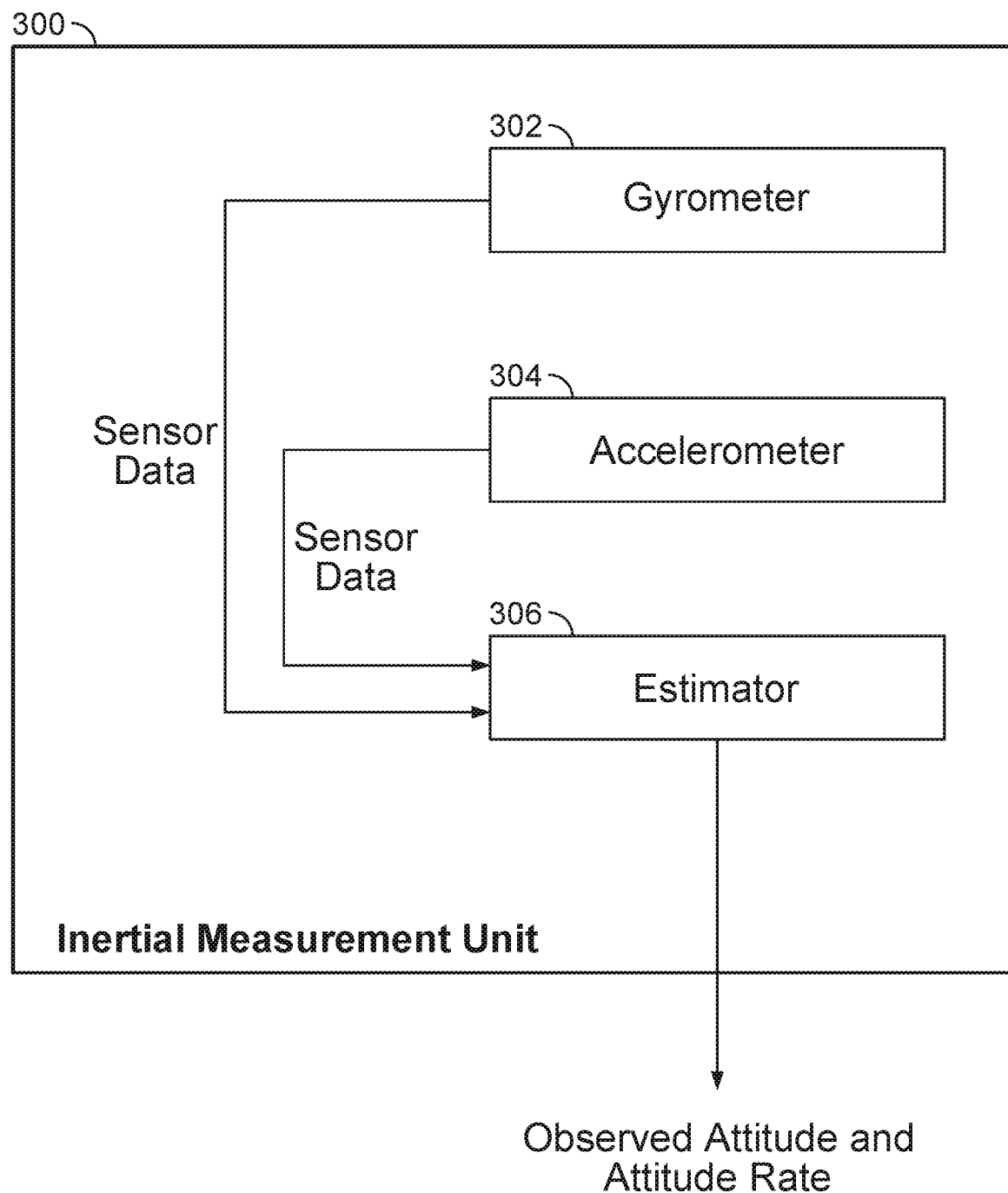
FIG. 3 is a diagram illustrating an embodiment of an inertial measurement unit.

FIG. 3 is a diagram illustrating an embodiment of an inertial measurement unit. In some embodiments, an inertial measurement unit is positioned centrally in the vehicle, for example at or near the vehicles center of mass. The inertial measurement unit is used to capture data about the vehicle's state. In the example shown, inertial measurement unit 300 includes gyrometer 302, accelerometer 304, and estimator 306. In various embodiments, inertial measurement unit 300 comprises multiple inertial sensors. Gyrometer 302 measures a rotational rate of the vehicle, whereas accelerometer 304 measures linear acceleration. Gyrometer 302 and accelerometer 304 provide sensor data to estimator 306. Angular rates may be determined based on a combination of the gyrometer and accelerometer measurements. For example, estimator 306 runs an estimation on received inertial sensor signals to determine an attitude and attitude rate of the vehicle. In some embodiments, estimator 306 is external of inertial measurement unit 300. In some embodiments, inertial measurement unit 300 produces attitude and attitude rate measurements for the vehicle while ignoring dynamics of the vehicle and its actuators. For example, inertial measurement unit 300 is opaque to the function or existence of vehicle actuators and purely measures rotation or acceleration of the vehicle.

Figure 4:
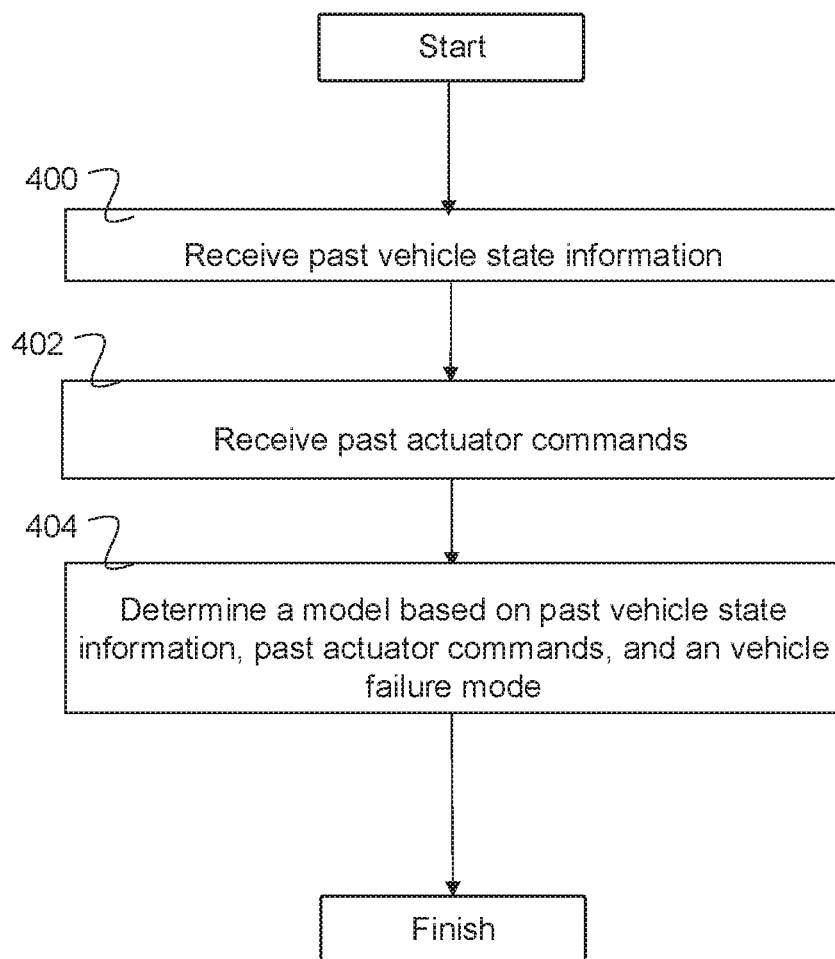
FIG. 4 is a flow diagram illustrating an embodiment of a model generator process.

FIG. 4 is a flow diagram illustrating an embodiment of a model generator process. In some embodiments, the process is implemented by model generator 102 of FIG. 1. The example shown is a process to create one model. In some embodiments, the process is repeated to create multiple models for different failure modes.

At 400, past vehicle state information is received. For example, a past attitude, a past attitude rate, a past position, a past velocity, a past wind velocity, or a past geometry of the vehicle may be received. Geometry of the vehicle comprises the physical configuration of the vehicle. The vehicle may comprise moving parts that change the physics of the vehicle, which affects the generated model. For example, an aircraft may comprise tilt-wings that can be rotated into different positions. The geometry of the aircraft includes information on a state of the tilt-wings.

At 402, past actuator commands are received. For example, the past actuator commands received at step 402 correspond to the past vehicle state information received at step 400. This permits the model generator to know what was specified to the actuator(s) and what actually happened as a result.

At 404, a model is determined based on past vehicle state information, past actuator commands, and a vehicle failure mode. For example, the past vehicle state information may identify what vehicle failure mode a particular set of data is associated with. This may permit the model generator to properly sort and/or group data (e.g., this is historic data for when the right front rotor goes out) and properly generate the models. In some embodiments, the model is determined based on an operable mode (e.g. in absence of actuator failure) rather than a failure mode. In some embodiments, the model is generated by executing one or more mathematical functions that takes the state information and actuator commands as inputs and outputs an expected state vector.

In this example, the model outputs an expected attitude and attitude rate based at least in part on (current) state information and actuator commands. To put it another way, the model includes the following function wherein x is a state vector, u is a vector of actuator commands, and t is time:

$$x_{t+1} = f(x_t, u_t)$$

The function f above models each failure mode independently (e.g., there may be a different function f for each failure mode, all of which input the same information but output different values). The output state vector is a model of vehicle state in the failure mode (e.g., expected attitude and attitude rate for that failure mode). In some embodiments, the function is predetermined before the vehicle is engaged (e.g. before an aircraft is takes off). The function may be determined based on physics of the vehicle. For example, a rotor failure is known to cause loss of force and torque but no changes in mass or inertia. When provided state information and actuator commands as input, the function outputs a model of vehicle state in the failure mode. In some embodiments, the function is a function approximation determined based on collected flight data. In some embodiments, the function is computationally simple and performed in real-time. In some embodiments, a look-up table is saved with pre-computed numbers. During vehicle engagement (e.g. flight), a model of current vehicle state (e.g. a state vector) is determined based on the look-up table. Referring back to FIG. 1, malfunctioning actuator identifier 104 may perform such function evaluation and/or table lookups.

In some embodiments, an initial predetermined function is improved with vehicle data collected while the vehicle is engaged (i.e., the models are updated in real-time). For example, flight data collected during flight is used to improve the model while an aircraft is in the air.

Figure 5:
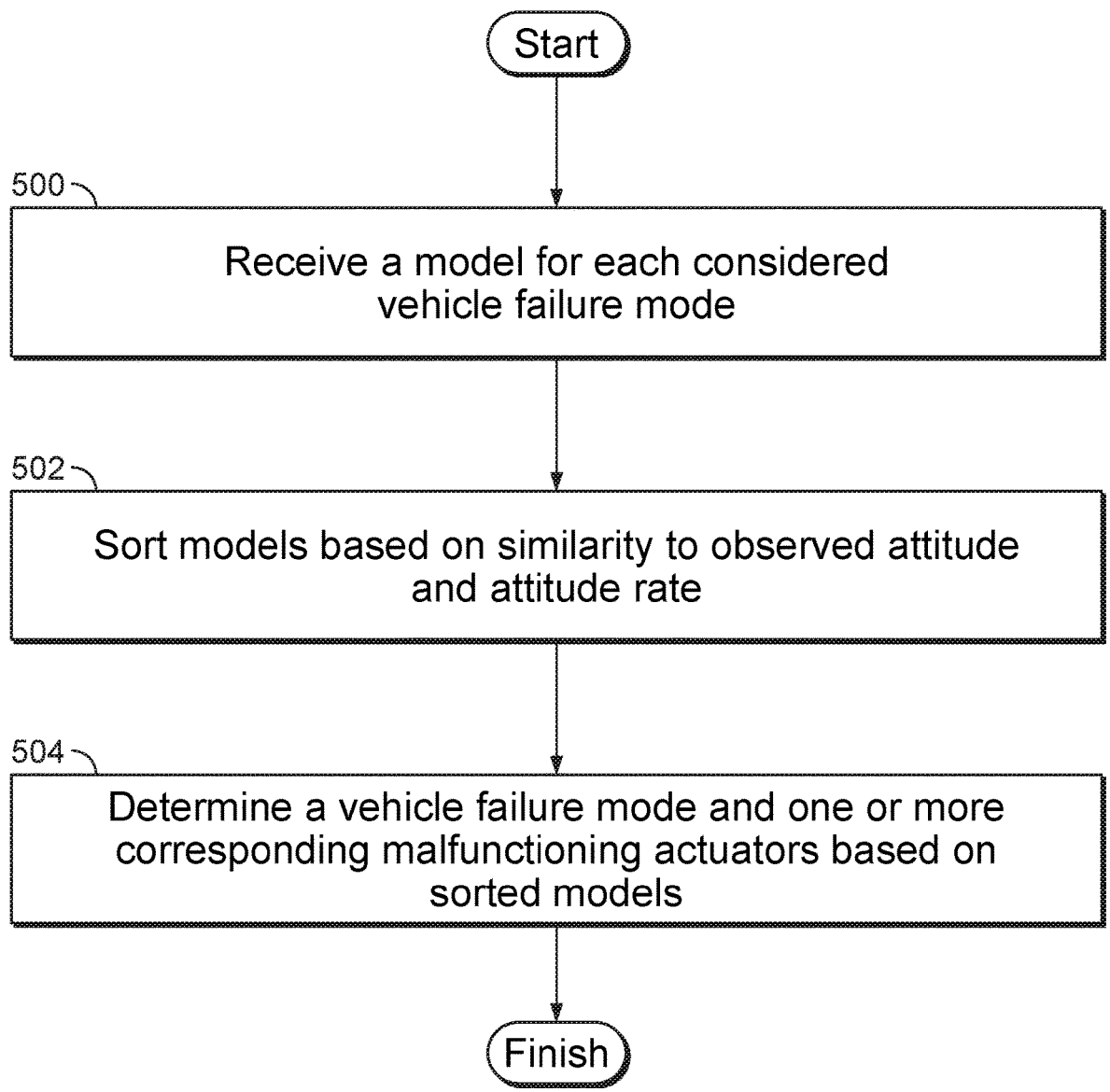
FIG. 5 is a flow diagram illustrating an embodiment of a process to identify a malfunctioning actuator.

FIG. 5 is a flow diagram illustrating an embodiment of a process to identify a malfunctioning actuator. In some embodiments, step 204 in FIG. 2 includes the process of FIG. 5.

At 500, a model is received for each considered vehicle failure mode. For example, in FIG. 1, the models are passed from model generator 102 to malfunctioning actuator identifier 104.

In some embodiments, a model is also received for an operable mode. A model may be determined for every possible vehicle failure mode. For example, in an aircraft comprising four rotors, a model is determined for a first rotor failure, a second rotor failure, a third rotor failure, a fourth rotor failure, a first and second rotor failure, a first and third rotor failure, a first and fourth rotor failure, a second and third rotor failure, and a second and fourth rotor failure. Multiple additional models may be determined including a model for no rotor failure and all rotor failure in addition to a first, second, and third rotor failure and a second, third, and fourth rotor failure. In some embodiments, the number of models determined is equal to the number of actuators squared plus one. In some embodiments, the number of considered failure modes is less than the total possible failure modes. For example, models may not be determined for less likely failure modes in order to limit computations performed.

At 502, models are sorted based on similarity to an observed attitude and attitude rate. For example, an expected attitude and expected attitude rate given a failure mode is determined or otherwise generated based on and/or for each model. In some embodiments, the models are sorted based on how closely their corresponding expected attitude and expected attitude rate matches the observed attitude and attitude rate. The sorted models may result in a sorted list of failure modes from most likely to least likely. For example, in the event a first rotor failure mode has a corresponding expected attitude that is 0.2 off from the observed attitude and an expected attitude rate that is 0.1 off from the observed attitude rate whereas a second rotor failure mode has a corresponding expected attitude that is 0.7 off from the observed attitude and an expected attitude rate that is 0.9 off from the observed attitude, the first rotor failure is determined to be more likely than the second rotor failure mode. In some embodiments, the summation of the difference between expected attitude and observed attitude and the difference between expected attitude rate and observed attitude rate is used to sort the models. In some embodiments, expected attitude is weighted more than expected attitude rate or vice versa. A model's similarity to observed metrics may be determined using various calculations based on the expected and observed values in various embodiments.

At 504, a vehicle failure mode and one or more corresponding malfunctioning actuators are determined based on the sorted models. In some embodiments, 502 and 504 are performed by malfunctioning actuator identifier 104 of FIG. 1. For example, the failure mode top of the sorted list may be selected. Actuator failures that correspond to the failure mode are determined to be in effect.

Figure 6:
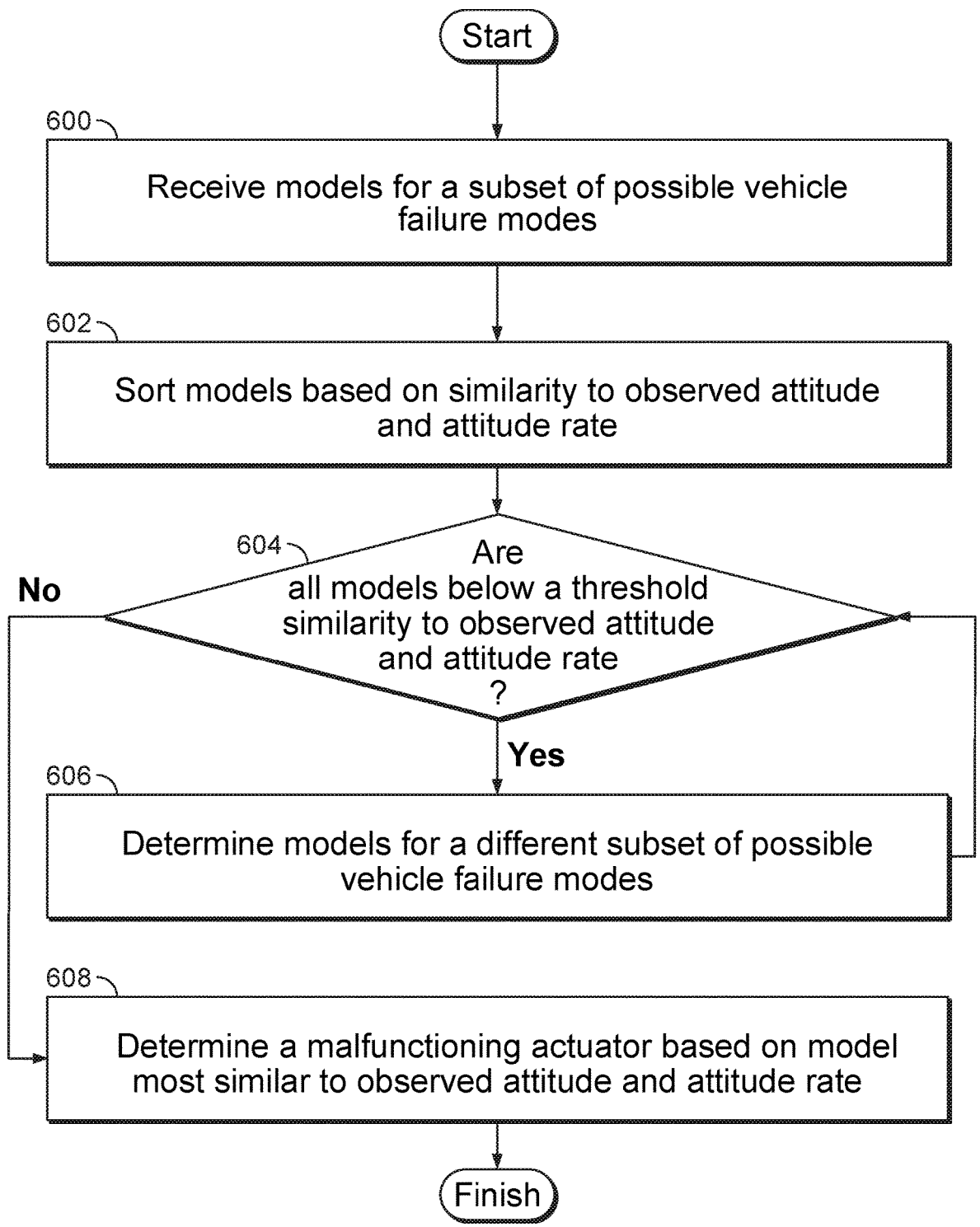
FIG. 6 is a flow diagram illustrating an embodiment of a process to identify a malfunctioning actuator using one or more subsets of possible failure modes.

FIG. 6 is a flow diagram illustrating an embodiment of a process to identify a malfunctioning actuator using one or more subsets of possible failure modes. In some embodiments it may be undesirable to evaluate all possible models and/or failure modes. For example, there may be many models and/or the computational cost of evaluating each model is relatively high. To address this, in some embodiments, only some of the possible vehicle failure modes are (e.g., initially) evaluated. This may conserve power and/or processing resources.

At 600, models for a subset of possible vehicle failure modes are received. For example, model generator 102 of FIG. 1 may perform step 600. In some embodiments, symmetry of a vehicle is considered in order to eliminate certain failure mode calculations. For example, due to symmetry it may be unnecessary to evaluate two models which correspond to symmetric failures since the output of one model may be easily obtainable from the output of the other model. For example, it may be sufficient to evaluate one model (e.g., inner front right rotor fails) and "flip" the results from that model about a longitudinal axis in order to get results that correspond to the corresponding or symmetric failure mode (e.g., inner front left rotor fails).

In some embodiments, the subset of possible vehicle failure modes comprises known likely vehicle failure modes. In some embodiments, the subset comprises recent previously detected failure modes. In some embodiments, the subset of possible vehicle failure modes includes a random set of vehicle failure modes.

At 602, models are sorted based on similarity to an observed attitude and attitude rate. For example, the models are sorted based on how well the expected attitudes and expected attitude rates of the models match the observed attitude and attitude rate. Similarity may be defined differently in various embodiments, for example due to relative importance of attitude compared to attitude rate or whether absolute value is used or not in calculations.

At 604, it is determined whether all models are below a threshold similarity to the observed attitude and attitude rate. For example, the threshold may specify that the summation of the difference between expected and observed attitude and the difference between expected and observed attitude rate is less than 2. The threshold may specify that the expected attitude and attitude rate must both be a 97% or greater match to the observed attitude and attitude rate.

In the event all models are below a threshold similarity to the observed attitude and rate, at 606 models for a different subset of possible failure modes are determined. For example, models corresponding to a first four most likely failure modes of a predetermined sorted list of possible failure modes are evaluated first and in the event all four are below the threshold similarity, models corresponding to failure modes ranked five through eight on the list are evaluated. Subsequently, the process returns to 604. To continue the example from above, at this second pass or iteration, it is determined whether the failure models ranked five through eight are all below the threshold similarity to the actual attitude and attitude rate.

In the event all models are not below a threshold similarity to the actual attitude and attitude rate, at 608 one or more malfunctioning actuators are determined based on the model most similar to the actual attitude and attitude rate. In other words, at least one of the models produced expected values which matched the observed values to a sufficient degree specified by the threshold similarity. For example, the malfunctioning actuators are determined based on the failure mode that corresponds to the model. Malfunctioning actuator identifier 104 of FIG. 1 may implement 602, 604, 606, and 608.

Figure 7:
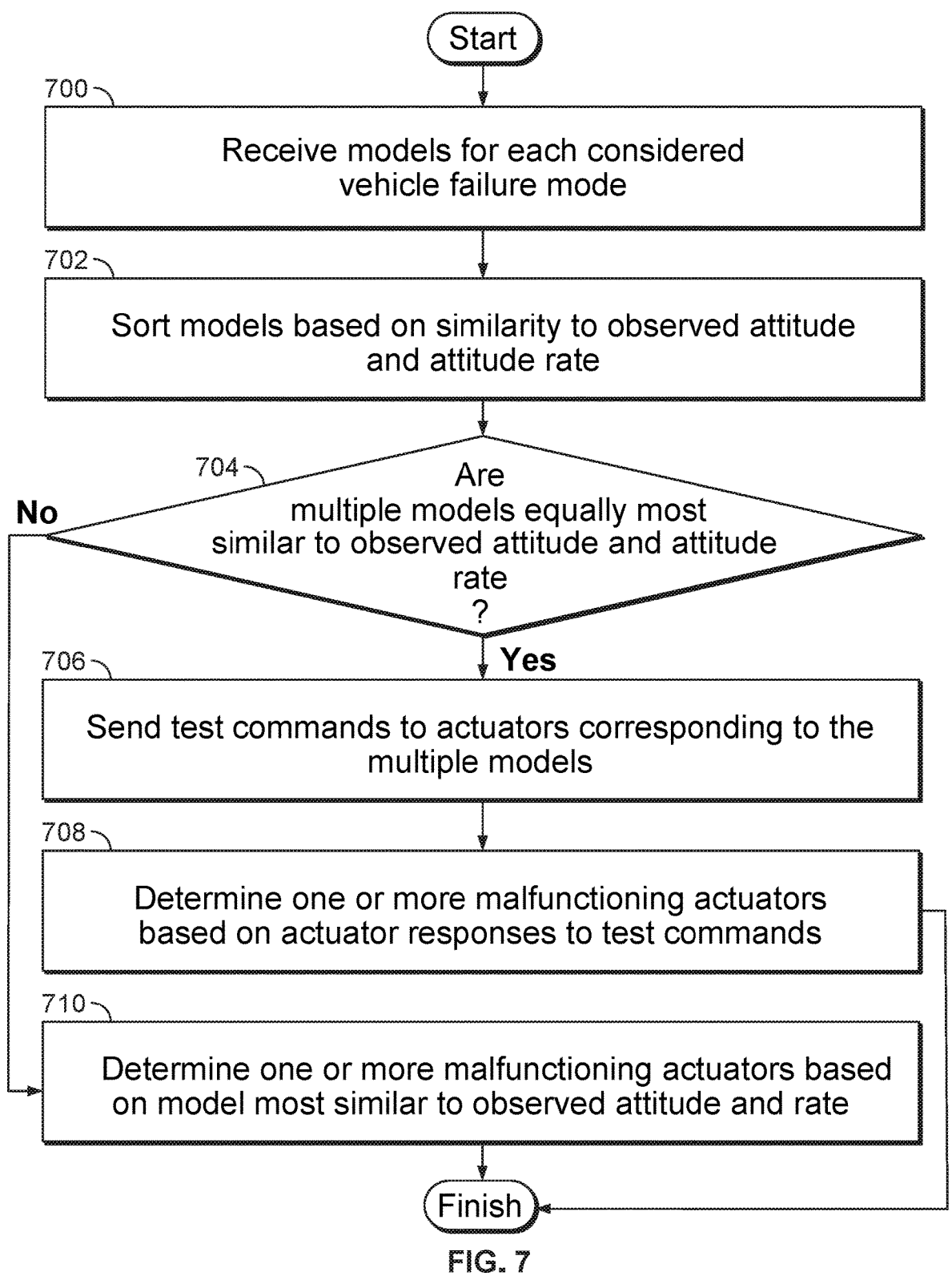
FIG. 7 is a flow diagram illustrating an embodiment of a process to identify a malfunctioning actuator using test commands.

FIG. 7 is a flow diagram illustrating an embodiment of a process to identify a malfunctioning actuator using test commands. In the example shown, after comparing the observed values and expected values, there are multiple possible models which equally match the observed state. That is, there is a tie. In this example, tie breaking is performed by exciting or otherwise stimulating the actuators (e.g., the various rotors) using test commands. In some embodiments, the process shown is implemented by actuator monitoring system 100 and control system 106 of FIG. 1.

At 700, models for each considered vehicle failure mode are received.

At 702, models are sorted based on similarity to actual attitude and attitude rate.

At 704, it is determined whether multiple models are most similar to the actual attitude and attitude rate. For example, multiple models may share the greatest similarity to the actual values if some difference metric between the observed state and expected state is the same.

In the event multiple models do not equally share the greatest similarity to the actual attitude and attitude rate, at 710 one or more malfunctioning actuators are determined based on the model most similar to the actual attitude and attitude rate.

In the event multiple models are equally most similar to the observed attitude and attitude rate, test commands are sent to actuators corresponding to the multiple models at 706. Test commands may be provided via control system 106 of FIG. 1. For example, models of three different failure modes may result in expected attitude and attitude rates that are all 30% likely. One model may correspond to a first flap failure, a second model may correspond to a second flap failure, and a third model may correspond to a third flap failure. Test commands are sent to the first flap, the second flap, and the third flap. For example, each flap receives a command to change to a new position that impacts a trajectory of the vehicle (e.g. an aircraft).

In some embodiments, test commands are sent in succession to each actuator corresponding to a model. The test commands may isolate the specified actuator. In some embodiments, test commands are sent to a subset of actuators corresponding to the multiple models that equally share the greatest similarity to the observed metrics. For example, a subset comprising actuators that historically have a high probability of failing may be tested first. Only in the event that no all actuators in the subset respond to the test command in an operable manner will a following subset of actuators be sent test commands.

At 708, one or more malfunctioning actuators are determined based on actuator responses to the test commands. Malfunctioning actuator identifier 104 of FIG. 1 may perform 708. For example, in the event the actuator does not respond appropriately based on the test command, the actuator is determined to be malfunctioning. In some embodiments, inertial measurement unit data is used to determine whether the actuator is responding appropriately. For example, a test command sent to the first flap should cause the aircraft to turn but sensor data indicates the aircraft is not turning.

In some embodiments, the existence of multiple models that share the greatest similarity to actual metrics signifies that an actuator in a specific region on the vehicle is malfunctioning, although the specific actuator or actuators may not be specifically determined or identified. For example, multiple actuators may be positioned closely to each other on the vehicle and have similar effects on the vehicle's trajectory. In some embodiments, knowledge of an actuator failure in a region of the vehicle (e.g., at least one rotor in a group of outer right rotors has failed) is sufficient information.

In various embodiments, various responses may be performed based on the knowledge that there is a (e.g., unspecific) failure in some region or group. The response may comprise changing a control scheme of the vehicle. For example, authority of second region is increased based on detection of an actuator failure in a first region. A control system of the vehicle may have a control scheme based on region. In some embodiments, models are determined based on failing regions rather than individual failing actuators. For example, actuators are sorted into groups. A model is determined based on a first group failure mode (e.g. at least one actuator in a group of right inner rotors is malfunctioning), a second group failure mode (e.g. at least one actuator in a group of right outer rotors is malfunctioning), and so on. In some embodiments, one or more specific failing actuator or actuators must be determined for the control system of the vehicle to accurately provide actuator commands and test commands are sent to actuators in the failing region.

Figure 8:
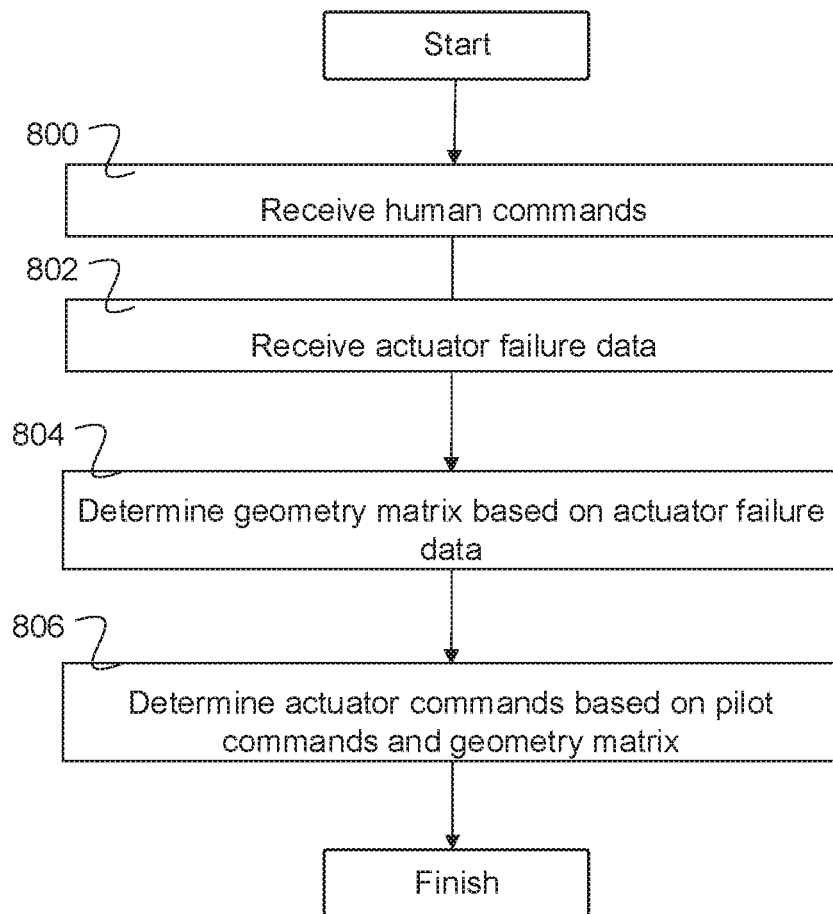
FIG. 8 is a flow diagram illustrating an embodiment of a process to respond to actuator failure data.
Figure 8:
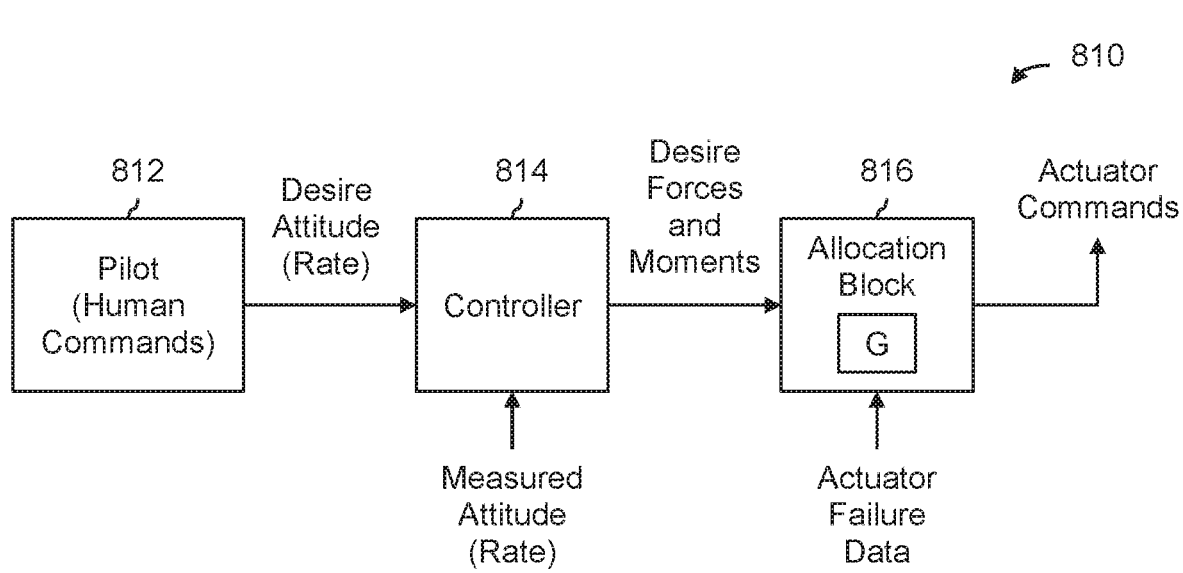

FIG. 8 is a flow diagram illustrating an embodiment of a process to respond to actuator failure data. In some embodiments, the process is implemented by control system 106 of FIG. 1. At 800, human commands are received. For example, commands are received from a pilot or driver via a joystick, brake, steering wheel, toggle, button, electronic interface, or any other vehicle control mechanism.

At 802, actuator failure data is received. Actuator failure data may be received from an actuator monitoring system. In various embodiments, actuator failure data specifies one or more failing actuators, a vehicle region that comprises one or more failing actuators, or a group of actuators that includes at least one failing actuator.

At 804, a geometry matrix is determined based on the actuator failure data. In some embodiments, the geometry matrix is a matrix of values that are determined based on the geometry and physics of the vehicle and actuator capabilities. The geometry matrix is multiplied by a desired forces and moments matrix to determine actuator commands. At 806, actuator commands are determined based on the pilot commands and the geometry matrix.

For example, the control system determines actuator commands based on the following equation, wherein G is the geometry matrix:

$$\text{Actuator commands} = G * \text{Desired Forces and Moments}$$

where the desired forces and moments matrix are output by a controller which inputs desired attitudes specified by a pilot (e.g., received at step 800). This desired forces and moments matrix is actuator independent. That is, it does not take into account the specifics of the actuators of the aircraft, such as how many actuators there are or where they are located on the aircraft. The geometry matrix is more aircraft, geometry, and/or actuator specific and maps the desired forces and moments into specific actuator commands (e.g., that take into account the number and/or placement of the actuators on the aircraft).

In some embodiments, the geometry matrix is changed and/or updated (e.g., at 804) based on and/or in response to actuator failure data in order to change force distributions and cause other actuators to compensate for one or more actuator failures. In some embodiments, the geometry matrix is precomputed and is updated while the vehicle in engaged (e.g., while in flight). In some embodiments, the geometry matrix is computed in real-time.

In some embodiments, a vehicle detects and responds to an actuator failure faster than a human can (e.g., less than a second). For example, within a short time period, the failing actuator is identified and a control scheme of the vehicle is adjusted to prevent a crash. In some embodiments, a human operator (e.g. pilot or driver) sends commands at a first frequency (e.g. on the order of 10 Hz), while a controller takes the human commands and outputs the desired forces and moment matrix at higher frequency (e.g. on the order of 1000 Hz). In some embodiments, the model creation, failure mode prediction, and control scheme response occurs at the same frequency at which the control system outputs actuator commands (e.g. on the order of 1000 Hz). The actuator monitoring system may be continuously engaged while the vehicle is engaged (e.g. the aircraft is in flight, a submarine is diving, a land and water hybrid vehicle is submerged, etc.).

Diagram 810 shows an example of blocks or components which perform the steps described above. A pilot (810) outputs human commands which include desired attitude and/or desired attitude rate. A controller (814) inputs the desired attitude and/or desired attitude rate, as well as a measured attitude and/or measured attitude rate. Desired forces and moments are output by the controller (814). An allocation block (816), which stores and manages a geometry matrix (G), uses the desired forces and moments and actuator failure data to output actuator commands.

Figure 9:
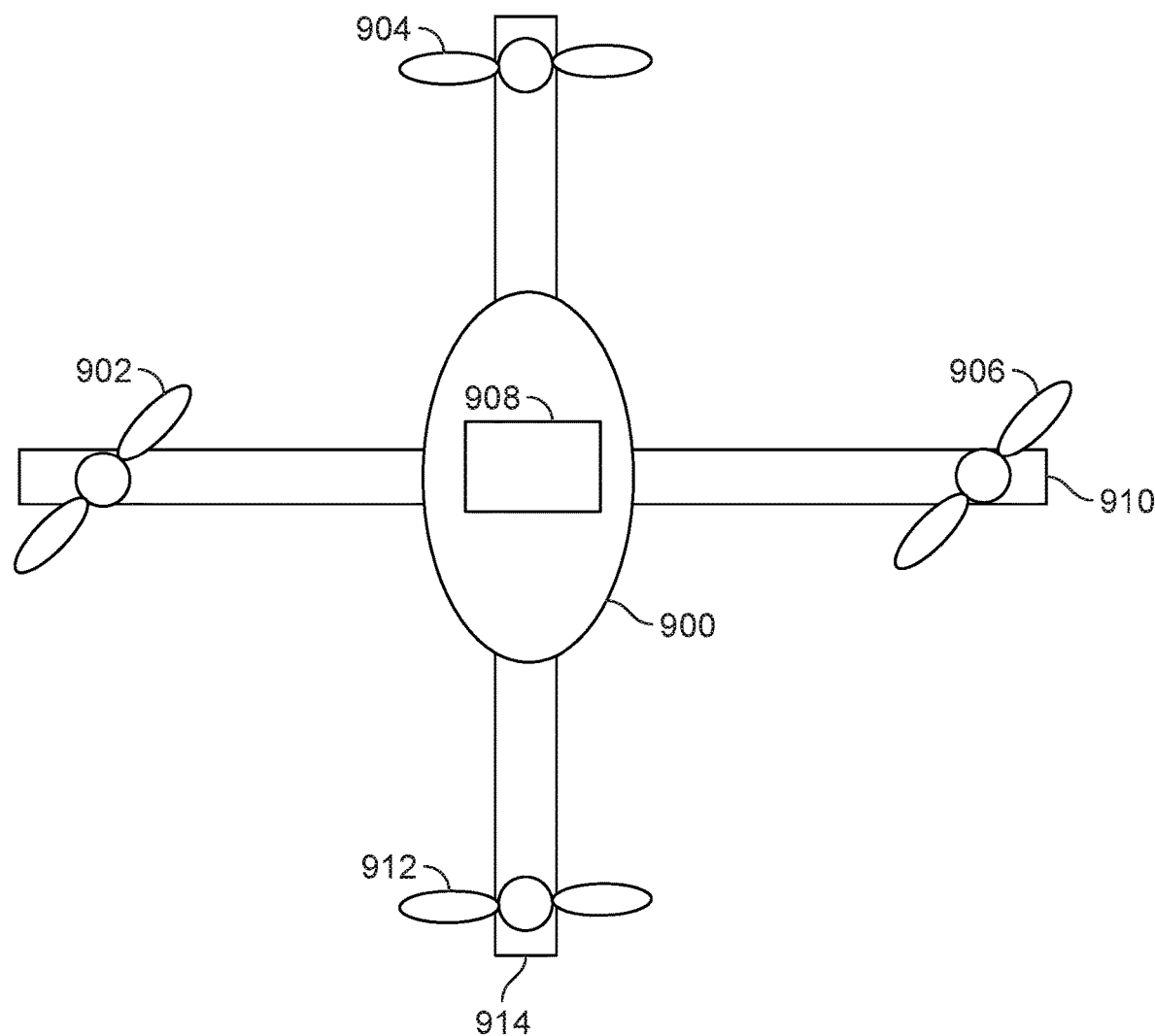
FIG. 9 is a diagram illustrating an embodiment of an aircraft that implements an actuator monitoring system.

FIG. 9 is a diagram illustrating an embodiment of an aircraft that implements an actuator monitoring system. In some embodiments, any number of the techniques described above are used in the exemplary aircraft. In the example shown, aircraft 900 is a multicopter comprising four rotors. The aircraft comprises inertial measurement unit 908 in its fuselage at the aircraft's center. Rotors 902 and 906 are positioned on opposite sides of the fuselage on beam 910. Rotors 904 and 912 are positioned on opposite sides of the fuselage on beam 914. The actuators of the aircraft comprise the rotors. In a multicopter with four rotors, determining a malfunctioning rotor based on inertial measurement data may be computationally simple.

Figure 10:
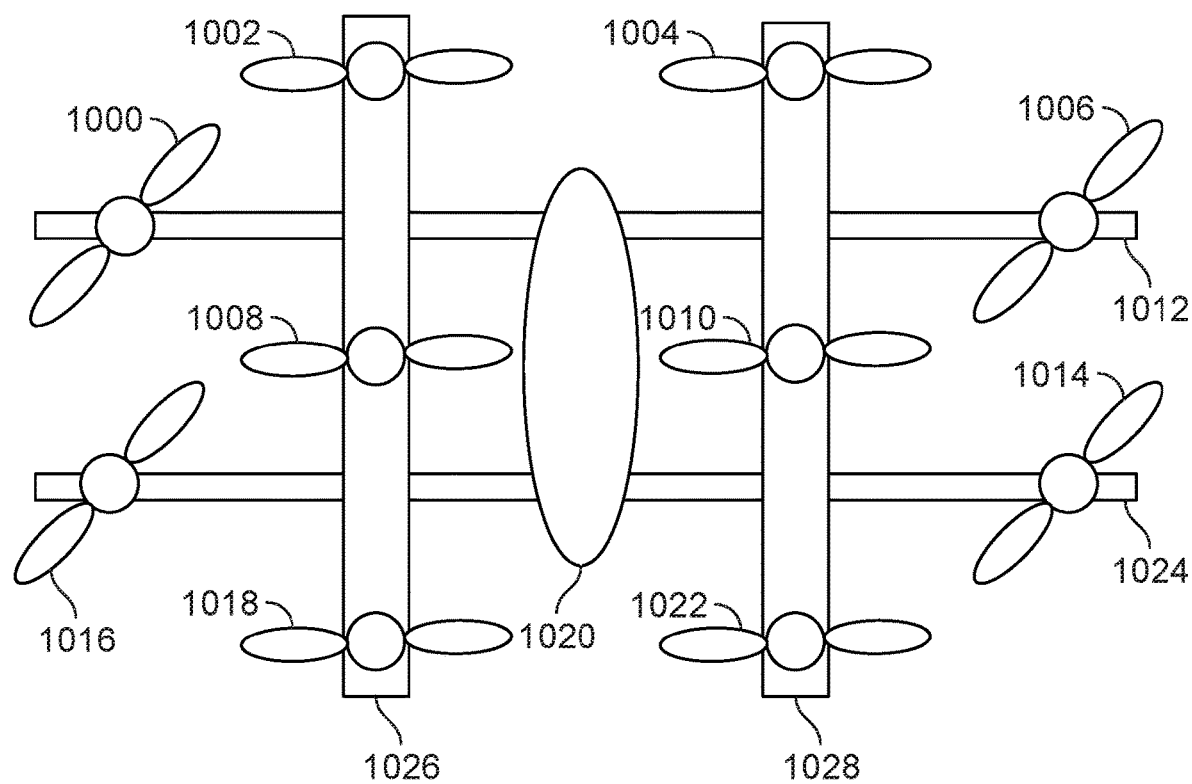
FIG. 10 is a diagram illustrating an embodiment of an aircraft that implements an actuator monitoring system.

FIG. 10 is a diagram illustrating an embodiment of an aircraft that implements an actuator monitoring system. In some embodiments, any number of the techniques described above are used in the exemplary aircraft. In the example shown, aircraft 1020 is a multicopter with ten rotors positioned around a fuselage. In the example shown, aircraft 1020 comprises parallel beams 1026 and 1028. Parallel beams 1012 and 1024 are perpendicular to beams 1026 and 1028. Rotors 1002, 1008, and 1018 are positioned on beam 1026. Rotors 1004, 1010, and 1022 are positioned on beam 1028. Rotors 1000 and 1006 are positioned on beam 1012. Rotors 1016 and 1014 are positioned on beam 1024. The disclosed system may determine which of the ten rotors is malfunctioning in the event a rotor is malfunctioning.

Figure 11A:
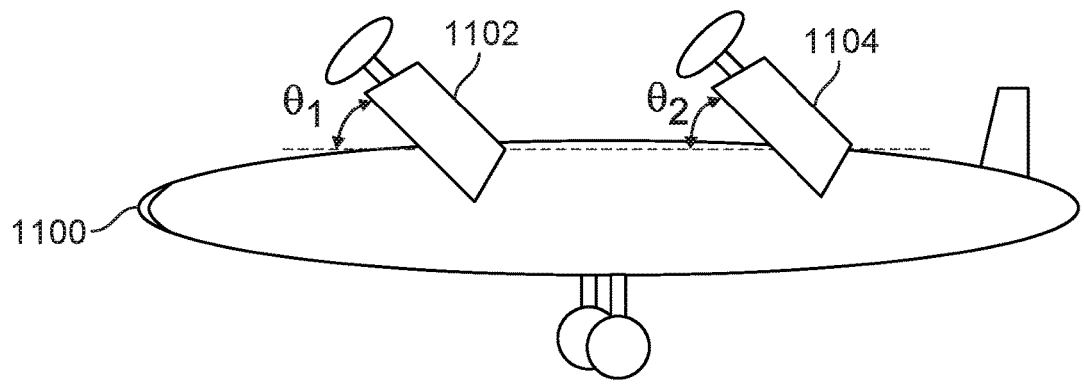
FIG. 11A is a diagram illustrating an embodiment of a tilt-wing aircraft that implements an actuator monitoring system.

FIG. 11A is a diagram illustrating an embodiment of a tilt-wing aircraft that implements an actuator monitoring system. In the example shown, tilt wing aircraft 1100 comprises tilt-wing 1102 and tilt-wing 1104. The tilt-wings may comprise actuators of the aircraft as well as the rotors on the wings shown. The actuator monitoring system may detect and cause response to tilt-wing or rotor failures.

Figure 11B:
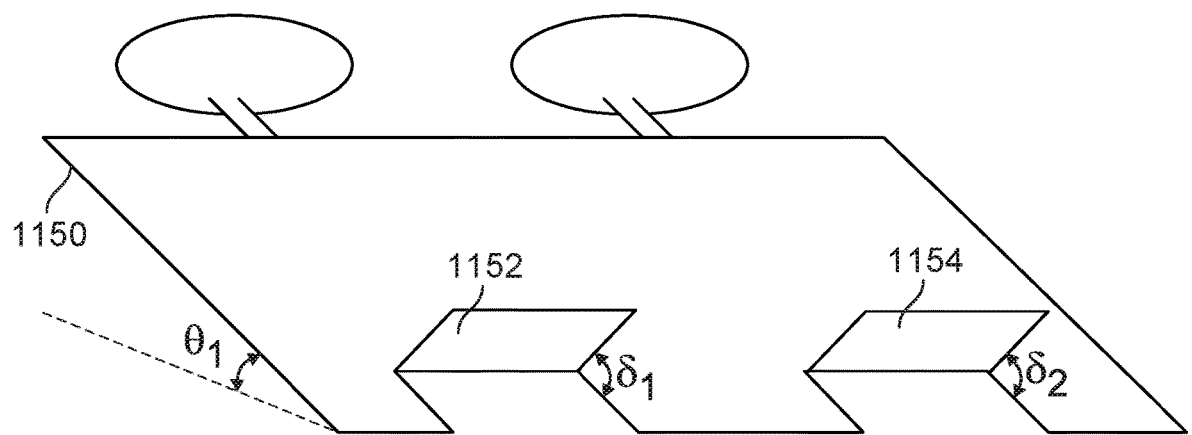
FIG. 11B is a diagram illustrating an embodiment of panels on a wing of a tilt-wing aircraft.

FIG. 11B is a diagram illustrating an embodiment of panels on a wing of a tilt-wing aircraft. In the example shown, tilt-wing 1150 comprises panels 1152 and 1154. The panels may be tilted at various angles to impact the aircraft's trajectory. The disclosed system may detect and respond to panel failures.

In various embodiments, the disclosed system is used in any appropriate vehicle that change attitude in its operation. For example, a vehicle that is operated in air, water, or a combination of air and water may utilize the disclosed system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
receive sensor data from an inertial measurement unit on a vehicle;
determine an observed attitude and an observed attitude rate of the vehicle based at least in part on the sensor data;
determine an expected attitude and an expected attitude rate of the vehicle based at least in part on a model associated with a vehicle failure mode;
identify, from a plurality of rotors associated with the vehicle, a malfunctioning rotor based at least in part on the observed attitude, the observed attitude rate, the expected attitude, and the expected attitude rate; and
in response to identifying the malfunctioning rotor, perform a responsive action, including by updating a geometry matrix, which is used to generate a plurality of actuator commands for the plurality of rotors, so that at least one non-malfunctioning rotor in the plurality of rotors compensates for the malfunctioning rotor.

2. The system recited in claim 1, wherein updating the geometry matrix includes updating a previous geometry matrix with a precomputed geometry matrix while the vehicle is in flight.

3. The system recited in claim 1, wherein updating the geometry matrix includes changing, in real time, one or more force distributions so that the at least one non-malfunctioning rotor in the plurality of rotors compensates for the malfunctioning rotor.

4. The system recited in claim 1, wherein:
the malfunctioning rotor is associated with a first region of the vehicle; and
updating the geometry matrix includes increasing an authority of a second region of the vehicle in response to detection of the malfunctioning rotor in the first region.

5. The system recited in claim 1, wherein identifying the malfunctioning rotor includes performing tie breaking using one or more test commands.

6. The system recited in claim 1, wherein identifying the malfunctioning rotor includes performing tie breaking among a plurality of equally possible malfunctioning rotors using one or more test commands, including by:
sending a first test command to a first possible malfunctioning rotor in the plurality of equally possible malfunctioning rotors;
receiving first test sensor data from the inertial measurement unit in response to the first test command;
sending a second test command to a second possible malfunctioning rotor in the plurality of equally possible malfunctioning rotors;
receiving second test sensor data from the inertial measurement unit in response to the second test command; and
selecting from the plurality of equally possible malfunctioning rotors using the first test sensor data and the second test sensor data.

7. A method, comprising:
receiving sensor data from an inertial measurement unit on a vehicle;
determining an observed attitude and an observed attitude rate of the vehicle based at least in part on the sensor data;
determining an expected attitude and an expected attitude rate of the vehicle based at least in part on a model associated with a vehicle failure mode;
identifying, from a plurality of rotors associated with the vehicle, a malfunctioning rotor based at least in part on the observed attitude, the observed attitude rate, the expected attitude, and the expected attitude rate; and
in response to identifying the malfunctioning rotor, performing a responsive action, including by updating a geometry matrix, which is used to generate a plurality of actuator commands for the plurality of rotors, so that at least one non-malfunctioning rotor in the plurality of rotors compensates for the malfunctioning rotor.

8. The method recited in claim 7, wherein updating the geometry matrix includes updating a previous geometry matrix with a precomputed geometry matrix while the vehicle is in flight.

9. The method recited in claim 7, wherein updating the geometry matrix includes changing, in real time, one or more force distributions so that the at least one non-malfunctioning rotor in the plurality of rotors compensates for the malfunctioning rotor.

10. The method recited in claim 7, wherein:
the malfunctioning rotor is associated with a first region of the vehicle; and
updating the geometry matrix includes increasing an authority of a second region of the vehicle in response to detection of the malfunctioning rotor in the first region.

11. The method recited in claim 7, wherein identifying the malfunctioning rotor includes performing tie breaking using one or more test commands.

12. The method recited in claim 7, wherein identifying the malfunctioning rotor includes performing tie breaking among a plurality of equally possible malfunctioning rotors using one or more test commands, including by:
sending a first test command to a first possible malfunctioning rotor in the plurality of equally possible malfunctioning rotors;
receiving first test sensor data from the inertial measurement unit in response to the first test command;
sending a second test command to a second possible malfunctioning rotor in the plurality of equally possible malfunctioning rotors;
receiving second test sensor data from the inertial measurement unit in response to the second test command; and
selecting from the plurality of equally possible malfunctioning rotors using the first test sensor data and the second test sensor data.

13. A computer program product, the computer program product being embodied in a non-transitory computer readable storage medium and comprising computer instructions for:
receiving sensor data from an inertial measurement unit on a vehicle;
determining an observed attitude and an observed attitude rate of the vehicle based at least in part on the sensor data;
determining an expected attitude and an expected attitude rate of the vehicle based at least in part on a model associated with a vehicle failure mode;
identifying, from a plurality of rotors associated with the vehicle, a malfunctioning rotor based at least in part on the observed attitude, the observed attitude rate, the expected attitude, and the expected attitude rate; and
in response to identifying the malfunctioning rotor, performing a responsive action, including by updating a geometry matrix, which is used to generate a plurality of actuator commands for the plurality of rotors, so that at least one non-malfunctioning rotor in the plurality of rotors compensates for the malfunctioning rotor.

14. The computer program product recited in claim 13, wherein updating the geometry matrix includes updating a previous geometry matrix with a precomputed geometry matrix while the vehicle is in flight.

15. The computer program product recited in claim 13, wherein updating the geometry matrix includes changing, in real time, one or more force distributions so that the at least one non-malfunctioning rotor in the plurality of rotors compensates for the malfunctioning rotor.

16. The computer program product recited in claim 13, wherein:
the malfunctioning rotor is associated with a first region of the vehicle; and
updating the geometry matrix includes increasing an authority of a second region of the vehicle in response to detection of the malfunctioning rotor in the first region.

17. The computer program product recited in claim 13, wherein identifying the malfunctioning rotor includes performing tie breaking using one or more test commands.

18. The computer program product recited in claim 13, wherein identifying the malfunctioning rotor includes performing tie breaking among a plurality of equally possible malfunctioning rotors using one or more test commands, including by:
sending a first test command to a first possible malfunctioning rotor in the plurality of equally possible malfunctioning rotors;
receiving first test sensor data from the inertial measurement unit in response to the first test command;
sending a second test command to a second possible malfunctioning rotor in the plurality of equally possible malfunctioning rotors;
receiving second test sensor data from the inertial measurement unit in response to the second test command; and
selecting from the plurality of equally possible malfunctioning rotors using the first test sensor data and the second test sensor data.

* * * * *